(12) United States Patent
Soffer

(10) Patent No.: US 10,194,011 B2
(45) Date of Patent: Jan. 29, 2019

(54) METHOD AND APPARATUS FOR SECURING VOICE OVER IP TELEPHONE DEVICE

(71) Applicant: High Sec Labs LTD., Yokneam industrial zone (IL)

(72) Inventor: Aviv Soffer, Caesarea (IL)

(73) Assignee: HIGH SEC LABS LTD., Yokneam Industrial Zone (IL)

( * ) Notice: Subject to any disclaimer, the term of this patent is extended or adjusted under 35 U.S.C. 154(b) by 0 days.

(21) Appl. No.: 15/277,424

(22) Filed: Sep. 27, 2016

(65) Prior Publication Data

US 2018/0091639 A1   Mar. 29, 2018

(51) Int. Cl.
*H04M 1/68* (2006.01)
*H04M 1/253* (2006.01)
*H04M 1/82* (2006.01)

(52) U.S. Cl.
CPC .......... *H04M 1/68* (2013.01); *H04M 1/2535* (2013.01); *H04M 1/82* (2013.01)

(58) Field of Classification Search
CPC .................................. H04M 1/68; H04M 1/82
See application file for complete search history.

(56) References Cited

U.S. PATENT DOCUMENTS

| | | | |
|---|---|---|---|
| 2008/0080703 A1* | 4/2008 | Penning | H04M 1/6066 379/428.02 |
| 2011/0208963 A1* | 8/2011 | Soffer | G06F 3/023 713/168 |
| 2013/0242858 A1* | 9/2013 | Amine | H04M 7/125 370/328 |

* cited by examiner

*Primary Examiner* — Tuan D Nguyen
(74) *Attorney, Agent, or Firm* — Browdy and Neimark, P.L.L.C.

(57) ABSTRACT

A security implant device and a method of operation of the security implant, for securing Voice over IP (VoIP) phone, the implant device disables audio input and output components of the VoIP phone in order to prevent audio eavesdropping.

34 Claims, 11 Drawing Sheets

Figure 1 (art)

METHOD AND APPARATUS FOR SECURING VOICE OVER IP TELEPHONE DEVICE

FIELD OF THE INVENTION

Figure 1:
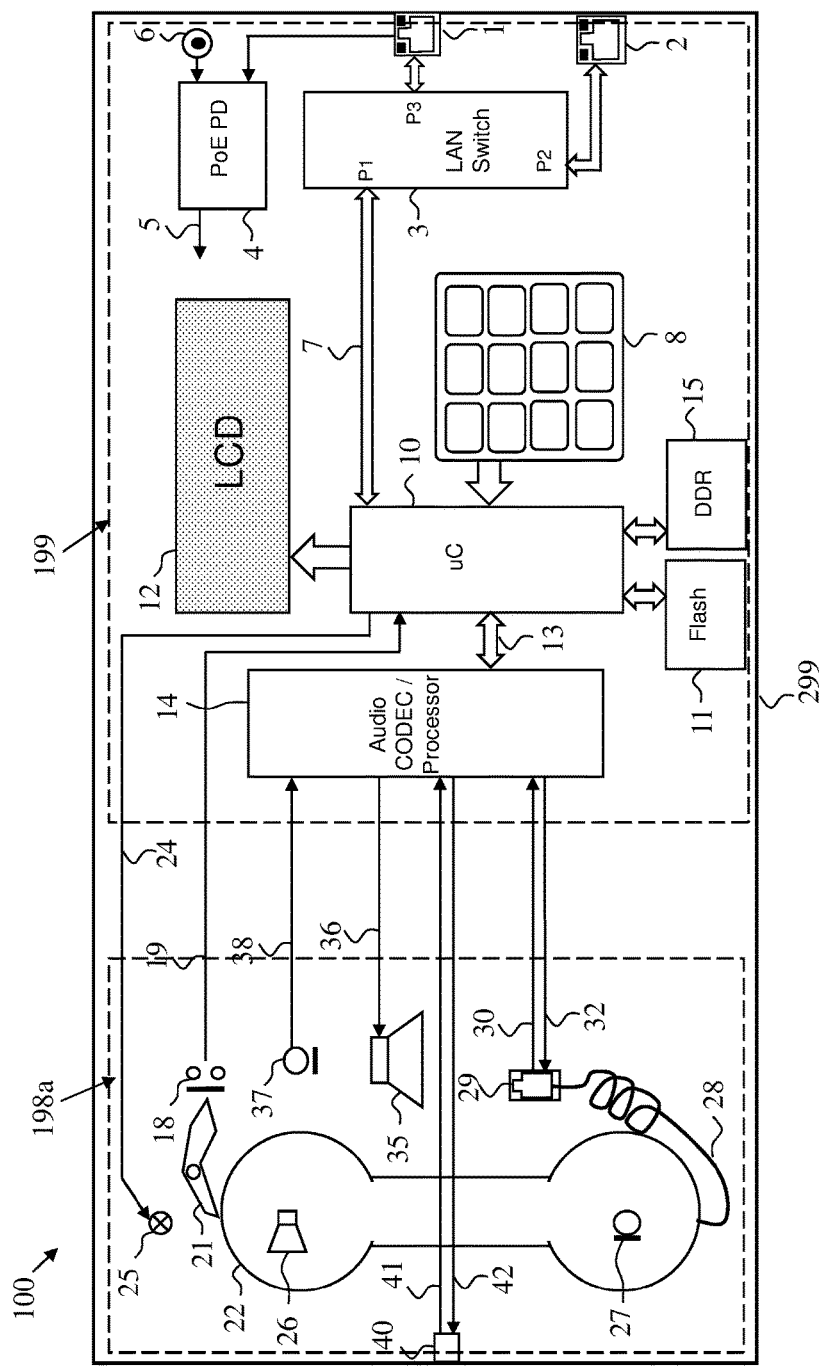

The present invention relates to a method and apparatus that enhances the security of Voice over Internet Protocol (VoIP) telephony devices. More specifically the present invention relates to a security implant that embedded inside a standard, non-secure VoIP telephone device in order to prevent remote attacker from exploiting the device to listen to surrounding classified conversations. Unlike prior art VoIP phone security methods that encrypt and protect the call and call related data, the method and apparatus of the present invention is intended to protect the phone device itself from being hacked.

BACKGROUND OF THE INVENTION

Since the 1980's, many organization are shifting from the analog telephony (also called PSTN—public switched telephone network) into newer Voice over IP telephony.

As VoIP telephony gained more popularity, production volumes increases and cost reduced. Competitive market conditions together with technological development assisted further VoIP cost reduction to a level that is similar or even lower than the older less capable PSTN telephony.

During the last decade, VoIP telephony became the industry standard for any small to large organization building a new system or retrofitting older PSTN system.

Among the reason that VoIP gained so much popularity over PSTN telephony are:
1. Better call quality.
2. Higher system reliability.
3. Long list of value added features such as: conference call, caller ID, phone directory, voice mail, email, call forwarding etc.
4. Low call cost (or even zero cost) on domestic and international calls.
5. Sharing the same physical infrastructure as computer network that already deployed.

For many organizations, the economical drive towards the transition from PSTN to VoIP telephony is strong, but still for many organizations there is an additional factor that delay or even stop this transition. This factor is security.

It is well accepted that VoIP telephony is having a long list of inherent security vulnerabilities compared to PSTN. Few dominant security vulnerabilities are:
1. Call being tapped and transmitted to a remote attacker;
2. Call information being transmitted to a remote attacker;
3. Phone handset or base microphone are activated by a remote attacker to enable audio eavesdropping at the vicinity of the phone;
4. Phone handset earphone element or base speaker are being exploited while user is unaware to enable audio eavesdropping at the vicinity of the phone;
5. Phone firmware stored on non-volatile memory or software running on volatile memory is being modified by a remote attacker in order to enable unsecure operations;
6. Phone having physical (for example implant) or software tampering due to supply-chain vulnerability.

Security efforts of the art concentrated on encrypting the voice data to prevent intercepting and decoding the call while the data is traveling in the Internet. Such encryption/decryption is standard, but requires low delay time. Example can be found by looking for:

Crypt secure messaging and VOIP service for Windows Phone.
www.gdmissionsystems.com/cyber/products/secure-voice/sectera-viper-phone General information relating to security venerability, of computers, and more specifically to computer peripherals such as cameras and microphones may be found in the following patents and applications:

U.S. Pat. No. 8,988,532; to Aviv Soffer; titled "Secure video camera device"; discloses a secure video camera device for reducing the risk of visual and audio eavesdropping has a video camera and an electromechanical shutter behind a transparent cover in a secured enclosure. The shutter optically obscures the camera lens when the device is in secure state.

U.S. 20130219525; to Aviv Soffer; titled "Secure audio peripheral device"; discloses a secure audio peripheral device, coupled to a computer, capable of enabling a user to use audio devices such as a microphone, speakers or headset when the device is in operational state, while giving to the user a clear visual indication that the audio devices are enabled. The device simultaneously disables the microphone; and turns off the visual indication when the device is in secure state.

U.S. Pat. No. 7,808,974 B2 patent application; to Goangshivan Shawn Ying, Eugene L. Edmon, Carlton L. Brown titled: "Method and apparatus for Voice over Internet Protocol telephony using a virtual private network"; discloses an apparatus and methods for utilizing a Voice over Internet Protocol (VoIP) telephone with a built-in VPN client.

U.S. Pat. No. 8,195,958 B2 patent application; to Steffen Fries; titled: "Security module for encrypting a telephone conversation"; discloses VoIP module that encrypts/decrypts the voice channels between two subscribers to avoid eavesdropping. Disclosed security module may be used for encrypting a telephone conversation which enables encryption of the voice data in a heterogeneous network including a packet-oriented data network and a telephone network.

U.S. Pat. No. 8,789,141 B2 patent; to Jae-Sun Chin, Gregory Henderson, Michael Raftelis titled "Method and apparatus for providing security for an internet protocol service"; discloses communication networks and, more particularly, a method and apparatus for providing security for a Voice over Internet Protocol (VoIP) service provided over an Internet Protocol (IP) based network through discarding of signaling message by the endpoint device, when the signaling message is received from a device not associated with one of the group of internet protocol addresses in the access control list.

U.S. Pat. No. 5,832,075; to Gancarcik; titled "Off-hook detector for headset" discloses an event detector for a headset connected to a telephone, comprising a switch for short circuiting a microphone of the headset and a circuit for detecting a hookswitch flash in the event the duration of the short circuiting of the microphone is greater than a predetermined minimum and less than a predetermined maximum duration.

SUMMARY OF THE EMBODIMENTS

The present invention relates to a method and apparatus that enhances the security of Voice over Internet Protocol (VoIP) telephony devices. More specifically the present invention relates to a security implant that embedded inside a standard, non-secure VoIP telephone device in order to prevent remote attacker from exploiting the device to listen to surrounding classified conversations.

It should be noted that the "standard, non-secure VoIP phone" as referred to herein may comprise security measures others than the subject of the current invention. Such "standard security measures" may include: physical locks to prevent removing the phone or unauthorized use of it; encryption the voice data or scrambling the voice; incoming call ID or outgoing call ID masking, etc. The electronics hardware in a standard VoIP phone, that performs the VoIP functions is defined in FIG. 1 (zone 199) and will be termed herein as "phone's standard hardware"; or "phone's non-secure hardware".

Similarly, some of the user's inputs and outputs are defined in FIG. 1 (zone 198a) and are termed "non-secure user's inputs and outputs" when used in the art. Same elements, when secured by the security implants of the current invention (zone 198 in FIGS. 2 and 3C) are termed secure inputs and outputs 198.

In view of the vulnerabilities listed above, it is desirable to provide a VoIP phone device that will mitigate these security vulnerabilities to a level that will allow it secure operation in classified environments. Such method and apparatus can become more practical and economical if it can be applied to off-the-shelf VoIP phone devices. This type of security enhancement kit may be used to greatly improve standard, non-secure low-cost VoIP phone devices that being produced in high volumes.

Such security enhancement kit may be installed by a trusted supplier to upgrade a standard, non-secure low-cost product to a certain level of higher security standard. This type of kit if properly designed and implemented, may increase the device security without significantly affecting the device cost.

The method and apparatus of the current invention may be used in combination with other devices and methods that intended to protect the call, caller ID and other related security assets. Plurality of software and hardware methods are available today to further improve call security by encrypting the call and by adding network security elements such as firewalls, intrusion detection and VPN (Virtual Private Network) appliances. The method and apparatus of the current invention is intended to protect the phone device itself from being hacked and abused by remote attacker. It does not replace or prevent the use of other security means that intended to secure other aspects and components of this complex and security vulnerable system.

It is one aspect of the current invention to provide a Secure VoIP Phone device comprising:

VoIP phone's standard hardware comprising: a LAN interface; and at least one processor;

secure inputs and outputs comprising: at least one microphone; at least one indicator; and an off-on hook switch; and a security implant comprising: at least one audio switch; and at least one tampering switch, wherein said security implant is configured not to be programmable via said VoIP phone's standard hardware, and said security implant is configured to allow normal VoIP call by: connecting said at least one microphone to said VoIP phone's standard hardware via said at least one audio switch, activating said at least one indicator to indicate active audio channel, only during active VoIP phone call, and only if said at least one tampering switch has not been activated.

In some embodiments the secure inputs and outputs comprises a handset having a handset microphone; said an off-on hook switch is configured to be in "on-hook" state when said handset rests in its cradle; and said security implant comprises a third analog audio switch for connecting said handset microphone to said VoIP phone's standard hardware only during active VoIP phone call.

In some embodiments the secure inputs and outputs comprises a base microphone; and said security implant comprises a first audio switch for connecting said base microphone to said VoIP phone's standard hardware only during active VoIP phone call.

In some embodiments the secure inputs and outputs comprises a base speaker; and said security implant further comprises a second analog audio switch to disable said base speaker when not in use.

In some embodiments the security functions of said security implant are monitored and controlled by a dedicated security microcontroller selectable from the list of: microcontroller, ASIC, FPGA, and PLD.

In some embodiments the security is programmed to detect pre-programmed on-of-hook switch activation patterns by measuring switch events timing.

It is another aspect of the current invention to provide a security implant for a VoIP Phone comprising: a handset microphone audio mute switching function to securely disable the microphone in the handset when the handset off-hook switch is in on-hook state; and electronic circuitry coupled to said phone off-hook switch at one side and to the said mute switching function in the other side to enable trustworthy synchronization between the switch state and the audio switching functions.

In some embodiments the security implant further comprising an additional mute switching function to disable the phone base microphone when not knowingly selected by the user through an off-hook signal and at the same time call in progress LED is illuminated.

In some embodiments the security implant further comprises an additional audio mute switching function to disable the handset headphone element when knowingly selected by the user through off-hook signal.

In some embodiments the security implant further comprising of an additional audio mute switching function to disable the phone base speaker when not knowingly selected by the user through one of the following enabling evens that were detected by the said electronic circuit: a) base speaker was selected by the user through speaker-phone function and at the same time off-hook switch is detected to be in off-hook state; or b) phone ringing detected by said electronic circuitry by detection of signals selectable from the group consisting of: audio ringing signal; and ringing LED driving signal asserted.

In some embodiments the security implant further comprising an additional audio mute switching function to disable the phone headset microphone when not knowingly selected by the user through off-hook switch in off-hook state and at the same time call in progress LED driving signal is asserted.

In some embodiments the security implant further comprising an additional audio mute switching function to disable the phone headset headphone element when not knowingly selected by the user through off hook switch state is off-hook and at the same time call in progress LED driving signal is asserted.

In some embodiments the security implant further comprising an additional audio data diode between the phone audio amplifier output and the handset headphone element to prevent audio eavesdropping through said handset headphone element.

In some embodiments the security implant further comprising an additional audio data diode connected between the phone audio amplifier output and the base speaker to prevent audio eavesdropping through said base speaker.

In some embodiments the security implant further comprising an additional audio data diode connected between the phone headset audio amplifier output and the headset headphone element to prevent audio eavesdropping through said headset headphone element.

In some embodiments the security implant wherein security functions of the security implant are monitored and controlled by an electronic device selectable from the group consisting of: microcontroller; ASIC; FPGA; and PLD.

In some embodiments said electronic device is having a USB interface with external connection to allow host USB device to connect to that function for data import and export.

In some embodiment said electronic device further comprising a non-volatile memory to enable storage of security implant data selectable from the list consisting of: firmware, configuration and log.

In some embodiments said electronic device is coupled through a switch function to a standard external phone interface selectable form the list consisting of: headset interface; and headphone interface, via a special USB to modular plug cable.

In some embodiments said electronic device is programmed to detect pre-programmed on-off-hook switch activation patterns by measuring switch events timing.

In some embodiments said electronic device electronic device drives at least one LED to provide user indications when the phone is in a secure state.

In some embodiments the security implant is coupled to the phone flash to provide write protection for said phone flash, unless flash write operation specifically allowed by the implant.

In some embodiments the phone flash write transactions of said phone flash are enabled only when user with proper credentials authenticated with a management PC connected to the security implant via a USB cable.

In some embodiments the security implant is further comprising of an active anti-tampering function having at least one tampering sensor and battery for power backup to enable detection of physical tampering event and to irreversibly and permanently disable the VoIP phone device operation after being triggered.

In some embodiments the security implant is further comprising at least one Tamper Evident Label coupled to the phone enclosure in order to provide evidence in case of attempted physical tampering.

In some embodiment the security implant functions are added after phone production in the form of at least one PCBA, wired through means selectable from the list consisting of: existing phone cables; new cables; and connectors and cable that fit in the phone existing connectors.

In some embodiments the security implant functions are embedded in the phone device design during production in one or more of the phone PCBAs.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Unless marked as background or art, any information disclosed herein may be viewed as being part of the current invention or its embodiments.

BRIEF DESCRIPTION OF THE OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 illustrates a block diagram of a typical VoIP phone device as known in the prior art.

Figure 2:
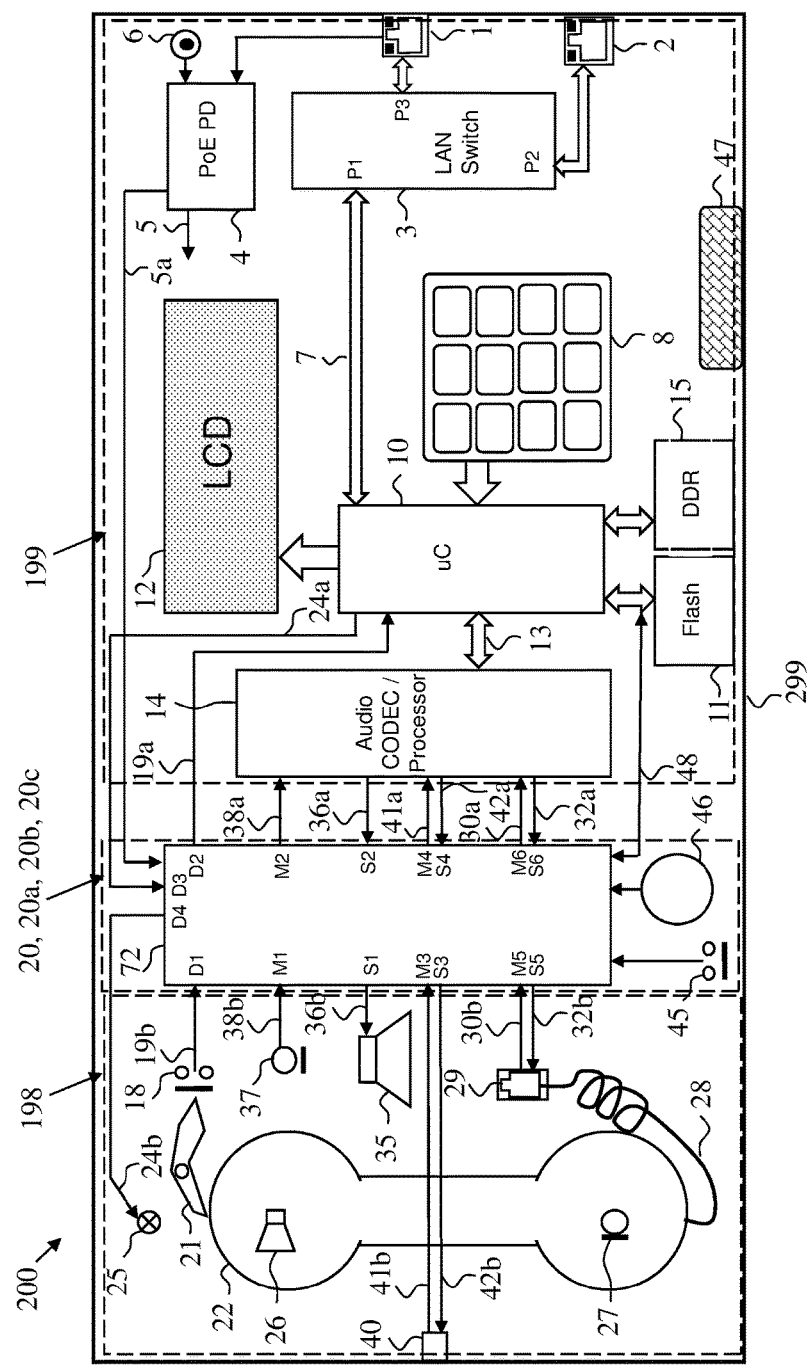

FIG. 2 schematically illustrates security enhanced VoIP phone device according to an exemplary embodiment of the current invention.

Figure 3A:
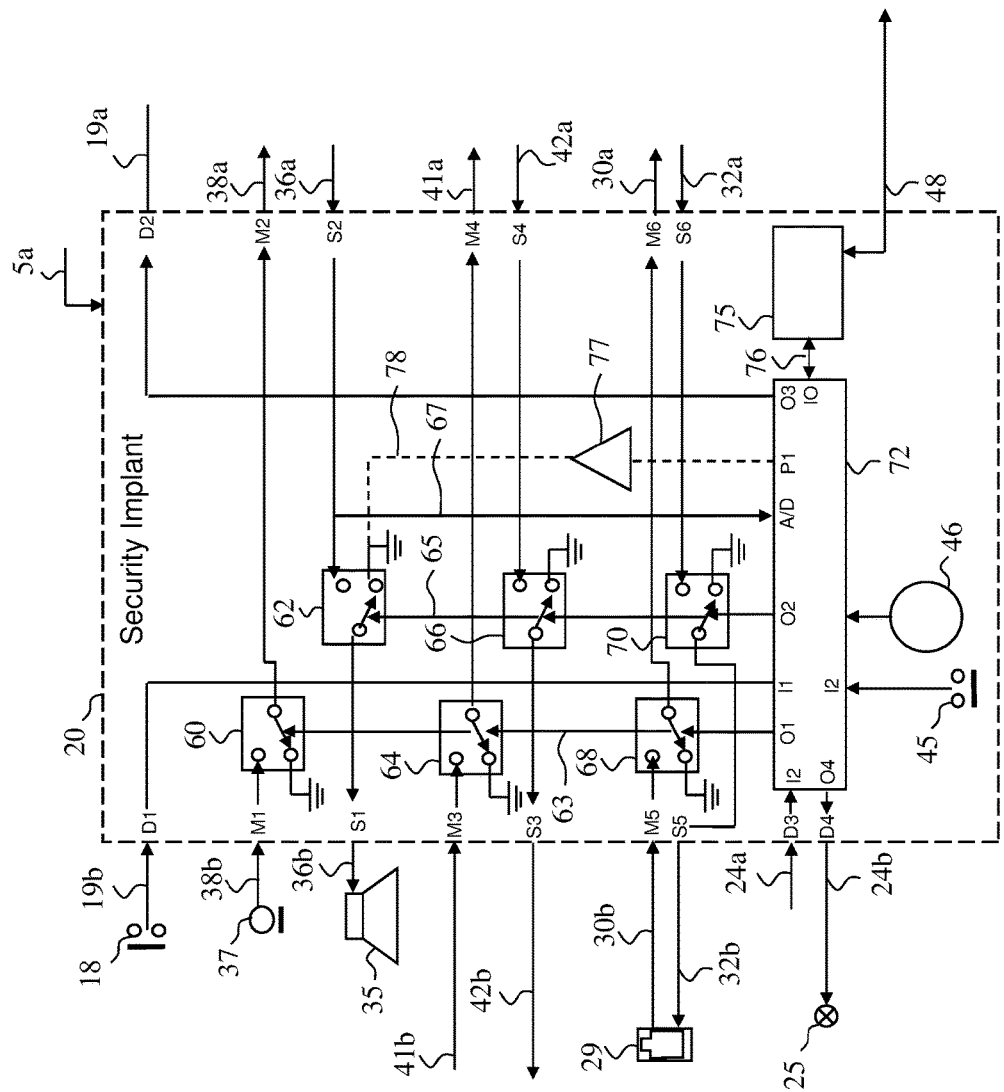

FIG. 3A schematically illustrates the security implant function shown in FIG. 2 according to an exemplary embodiment of the current invention.

Figure 3B:
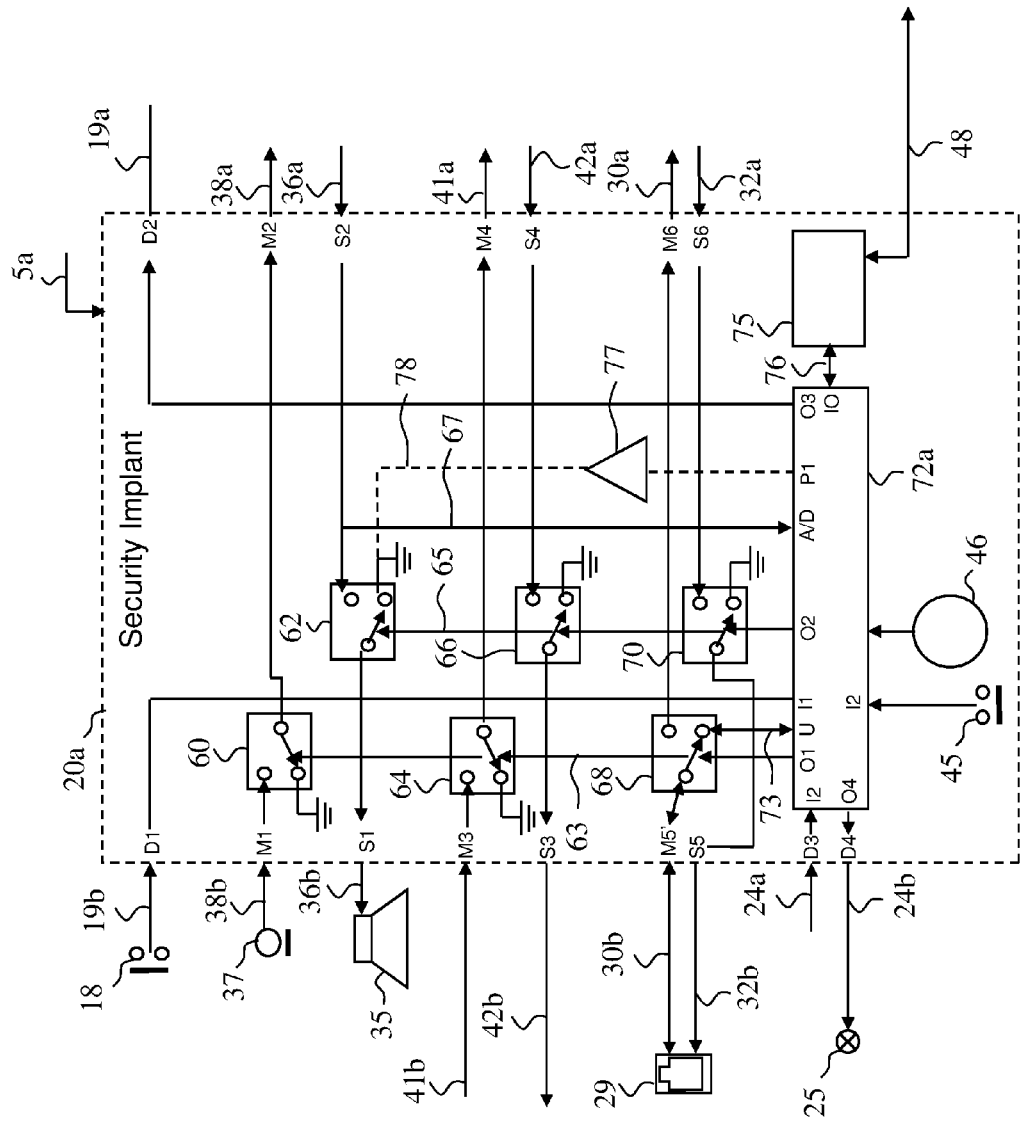

FIG. 3B schematically illustrates a security implant function according to another exemplary embodiment of the current invention.

Figure 3C:
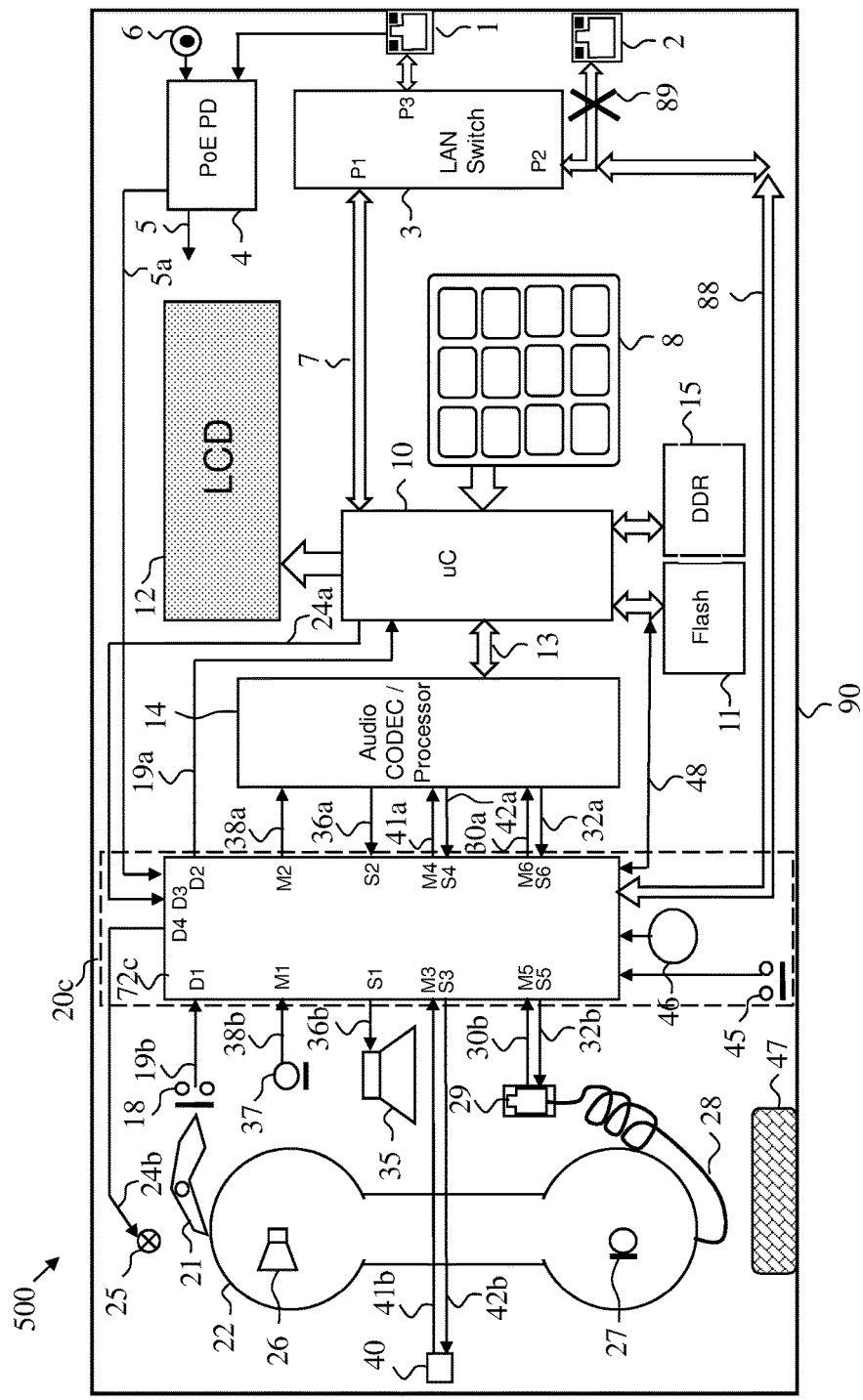

FIG. 3C schematically illustrates a security enhanced VoIP phone device according to another exemplary embodiment of the current invention.

Figure 3D:
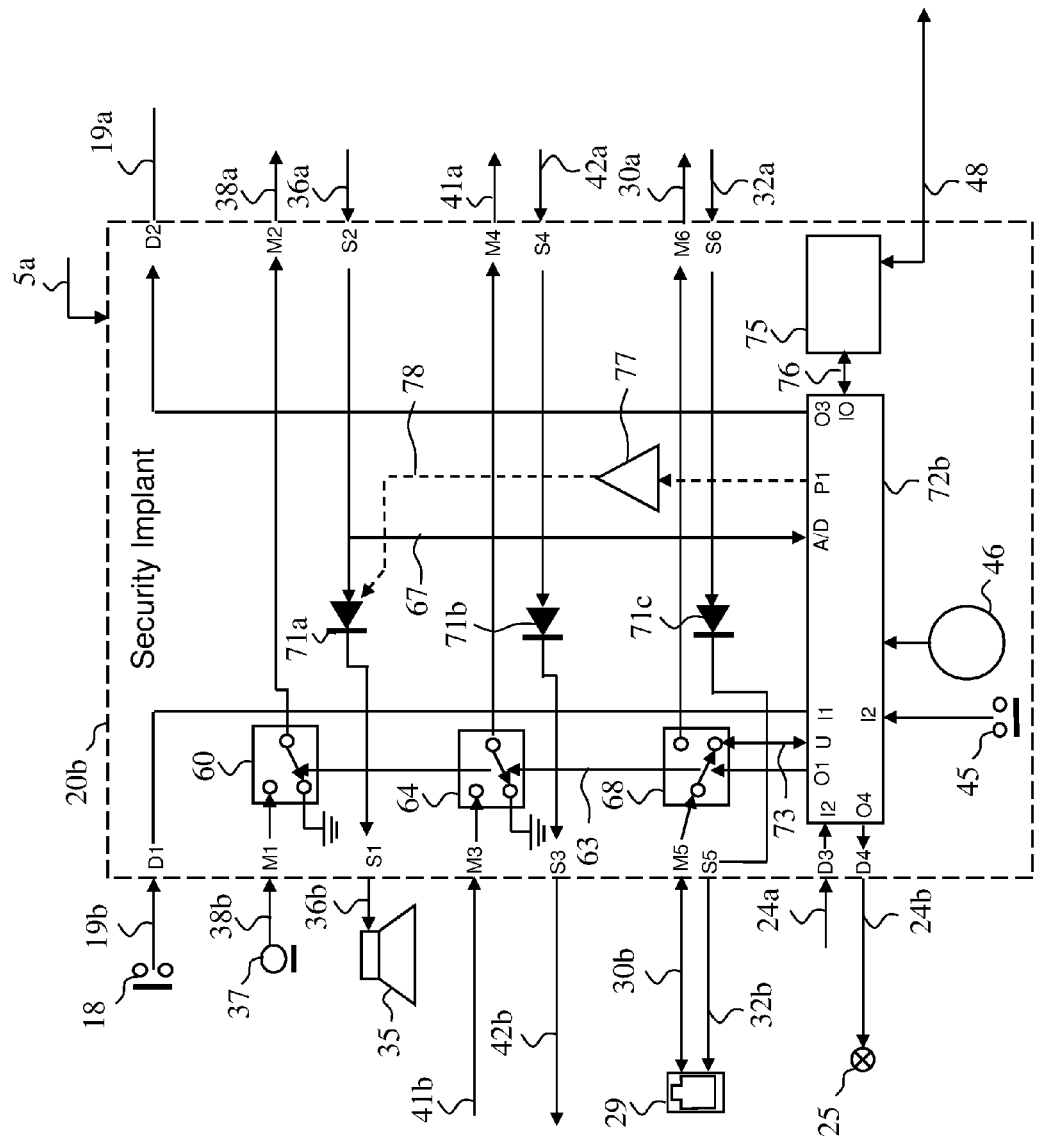

FIG. 3D schematically illustrates another exemplary security implant function similar to the security implants of FIGS. 3A and 3B according to an exemplary embodiment of the current invention.

Figure 4A:
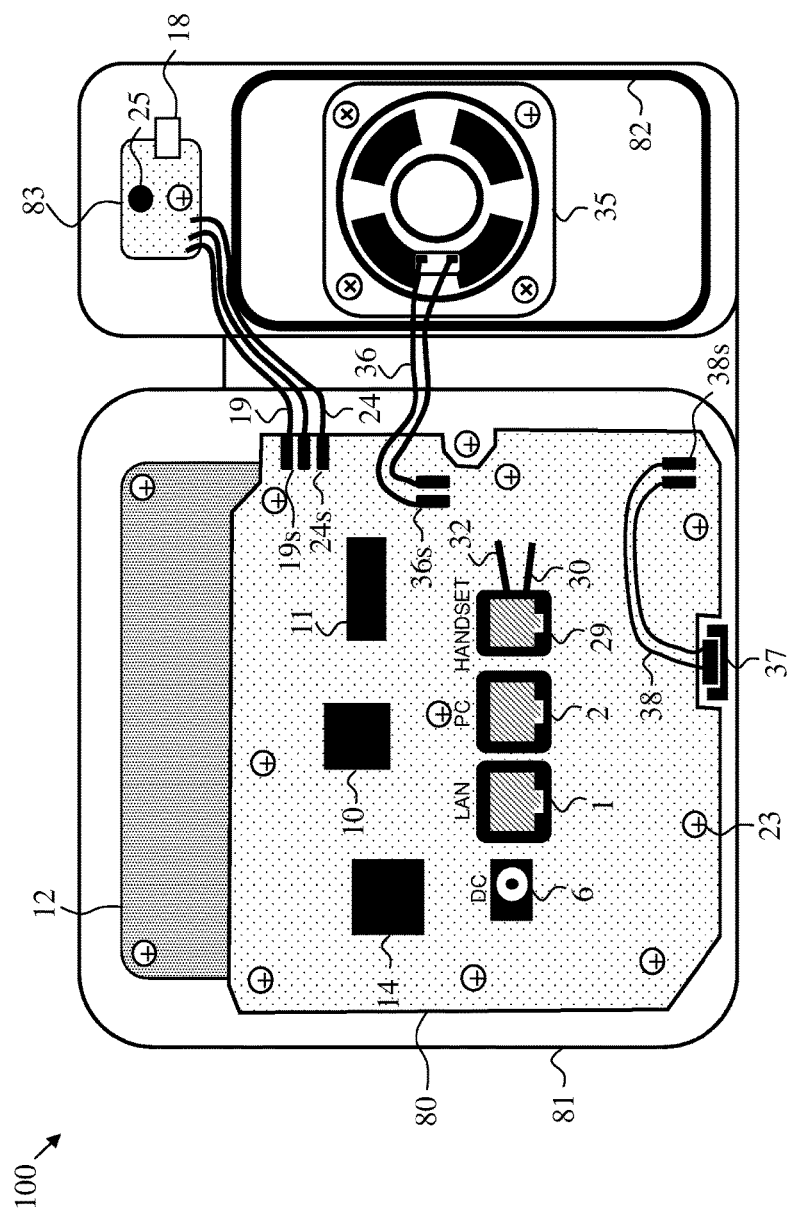

FIG. 4A schematically illustrates a rear-view of a typical VoIP phone device known in the art.

Figure 4B:
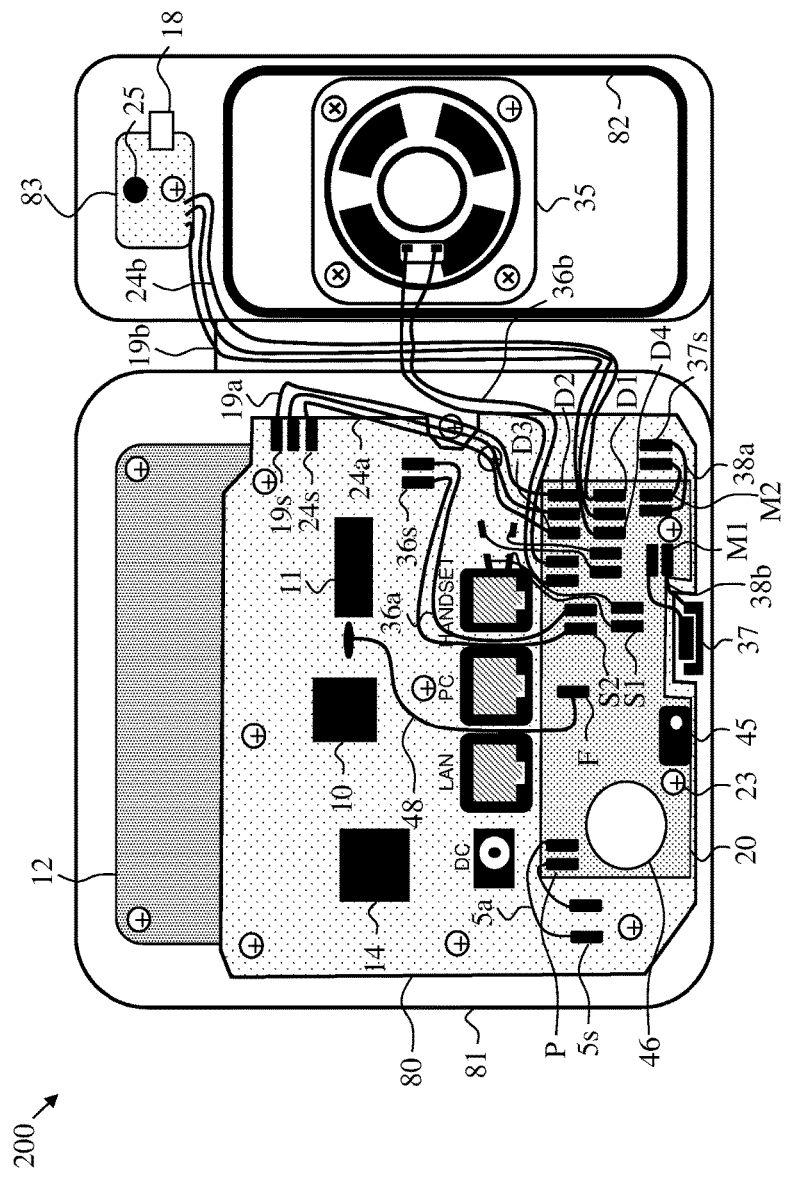

FIG. 4B schematically illustrates a rear-view of a VoIP phone device according to an exemplary embodiment of the current invention.

Figure 4C:
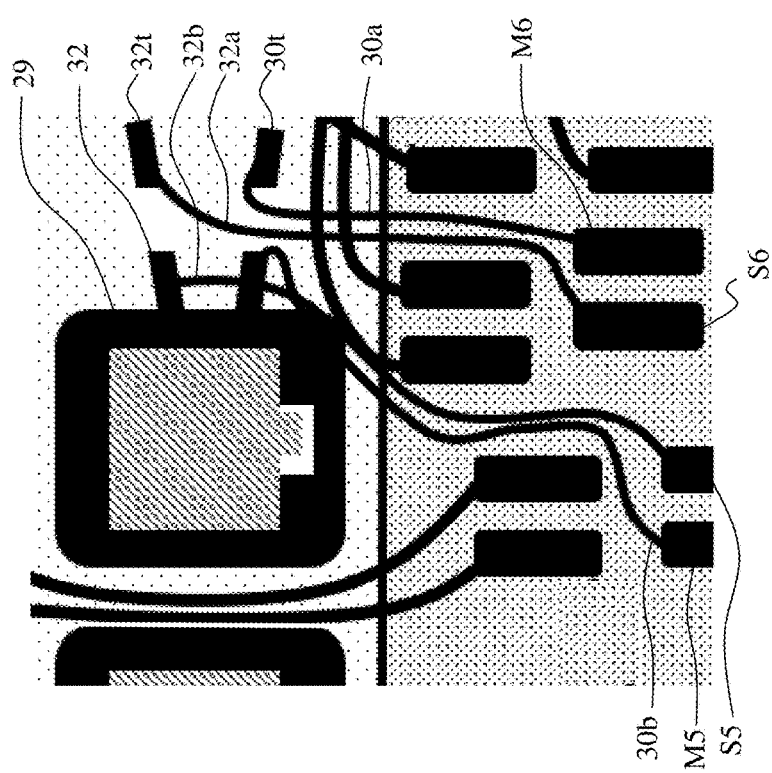

FIG. 4C schematically illustrates in greater detail the security implant wiring to the handset modular jack, according to an exemplary embodiment of the current invention.

Figure 5A:
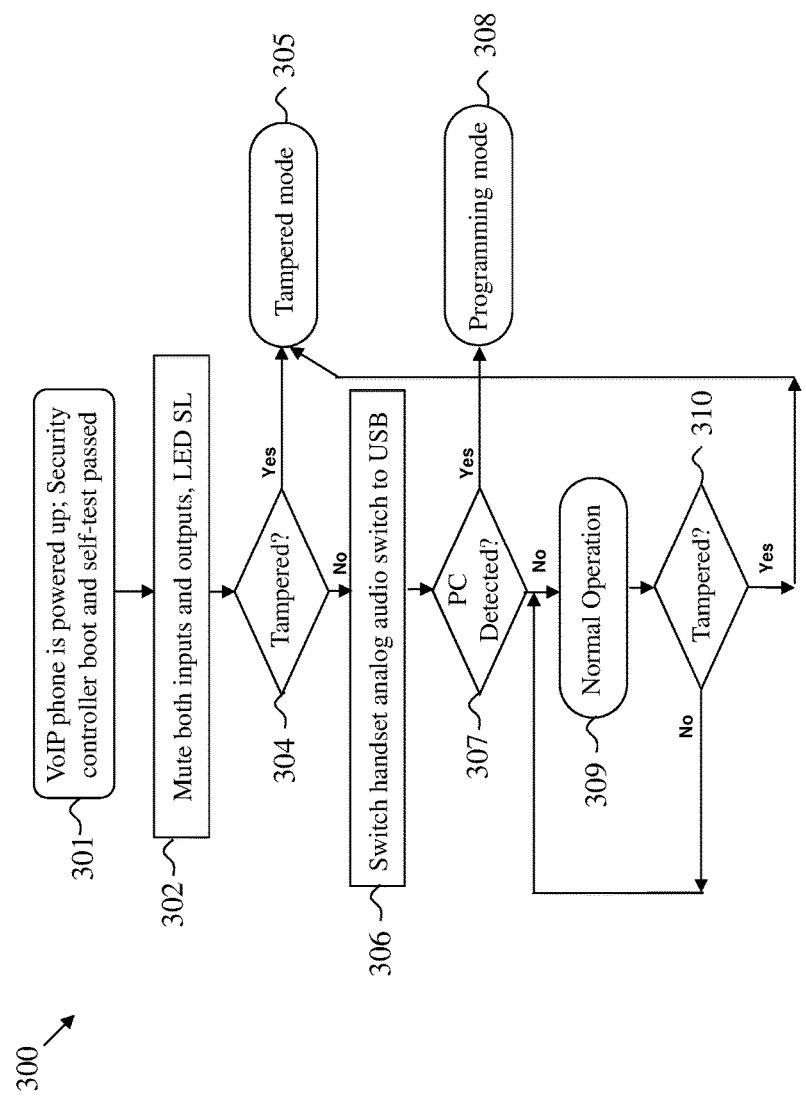

FIG. 5A schematically illustrates a high-level block diagram of method for powering up a device according to an exemplary embodiment of the current invention.

Figure 5B:
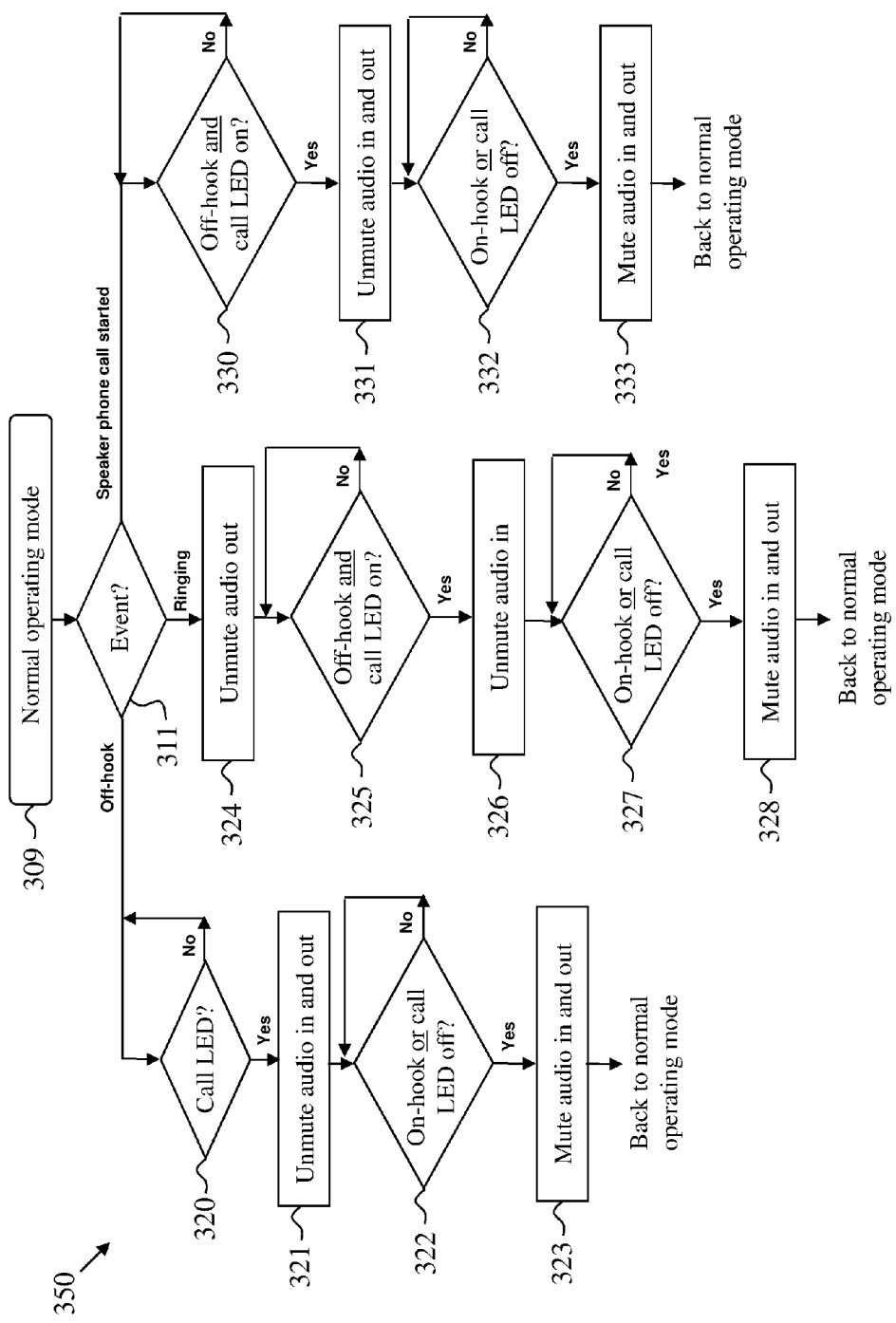

FIG. 5B schematically illustrates a high-level block diagram of a method of operation, of a VoIP phone device while it is in Normal Operating mode, according to an exemplary embodiment of the current invention.

DETAILED DESCRIPTION OF THE DRAWINGS

Before explaining at least one embodiment of the invention in detail, it is to be understood that the invention is not necessarily limited in its application to the details set forth in the following description or exemplified by the examples. The invention is capable of other embodiments or of being practiced or carried out in various ways.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In discussion of the various figures described herein below, like numbers refer to like parts. The drawings are generally not to scale. For clarity, non-essential elements may have been omitted from some of the drawing.

To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, or the like) or multiple pieces of hardware. Similarly, the programs may be stand-alone programs, may be incorporated as subroutines in an operating system, may be functions in an installed software package, and the like.

FIG. 1 schematically illustrates a block diagram of a typical VoIP phone device 100 as known in the prior art.

In this figure, VoIP phone device 100, situated in enclosure 299, is having first LAN jack 1 to enable connection of the device to the LAN (Local Area Network) switch (not shown here). First LAN jack 1 is typically RJ45 standard modular jack having internal or external LAN magnetics for impedance matching, noise filtering, power delivery and safety isolation. First LAN jack 1 is internally coupled to the Power over Ethernet (PoE) Powered Device (PD) block 4 to enable device 100 operation without local power source. PoE PD block generating one or more DC voltage 5 that power the entire device 100 circuitry. Typical voltages would be 5V, 3.3V and 1.2V. Optional DC power jack 6 enables device 100 power from local 48 VDC or AC power supply (not shown here) in the case that network does not support POE.

An example of PoE PD 4 chip is Silicon Labs Si3402. This chip comprises of IEEE 802.3-Compliant POE PD interface together with isolated/non-isolated switching regulator.

First LAN jack 1 is further coupled to the 3-port LAN switch 3 port P3 to enable support of a both VoIP phone device 100 and PC (not shown here) through a single LAN extension. An example of 3-Port LAN switch chip is Micrel/Microchip KSZ8863RLL managed switch having two 10/100 Base-TX transceivers to support LAN and PC and one RMII (Reduced media-independent interface) to support the device microcontroller function 10. In this figure PC is coupled to the device 100 through the optional second LAN jack 2 that is in turn coupled to the LAN switch 3 second port P2. First 3-port LAN switch 3 port P1 is coupled to the microcontroller function 10 through RMII lines 7.

Second LAN jack 2 is typically RJ45 standard modular jack having internal or external LAN magnetics for impedance matching, noise filtering, and safety isolation.

Microcontroller function 10 may have internal or external functions such as RAM (Random Access Memory), DSP (Digital Signal Processor), Audio CODEC (coder/decoder) etc. Microcontroller function 10 runs and manage all VoIP phone 100 digital functionality and user interface. In this example the microcontroller function 10 is coupled to an external flash device 11 and external DDR (Dual Data Rate) volatile memory 15.

The user interface is typically based on textual or graphical an LCD (Liquid Crystal Display) panel 12 that provides user indications, and push-buttons/keypad 8 that enables user inputs (for example phone number dialing).

Microcontroller function 10 is further coupled to the audio CODEC or processor function 14 through serial bus 13 (for example I2S). Audio CODEC or processor function 14 (sometimes called Audio Processor, Acoustic Echo Cancelation or Analog Front End or AFE) handles all VoIP phone device 100 analog functions. For example: audio mixer, audio power amplifier, music playback, Dual-tone multi-frequency signaling (DTMF) receiver, audio pre-amplifier, microphone bias generator, filter, Acoustic Echo Cancelation, Line Echo Cancellation, Analog to Digital conversion and Digital to Analog conversion. Audio CODEC or processor function 14 may be supported by external devices—for example Audio Class-D amplifier and microphone preamplifier.

An example of microcontroller function 10 is DSP Group DVFD8187BE chip that integrates ARM 926 core with DSP (digital signal processor), Analog Front End (AFE) 14 and speaker amplifier. It also integrating the power supply circuitry to generate 1.2V, 1.8V, 3.3V power planes.

Audio CODEC or processor function 14 drives and support directly or through external electronic circuitry the following audio transducers:

1. Phone base microphone 37 coupled through lines 38, to enable hands-free call operation audio input;
2. Phone base speaker 35 coupled through lines 36, to enable hands-free call operation audio output;
3. Handset microphone element 27, in handset 22, coupled through coiled multi-conductor cable 28, modular handset jack 29 and lines 30 to enable call audio input while holding the handset;
4. Handset 22 earphone element 26 coupled through coiled multi-conductor cable 28, modular handset jack 29 and lines 32 to enable call audio output while holding the handset;
5. Optional headset microphone (not shown here) coupled though the headset modular jack 40 and lines 41 to enable audio input while using is wearing an headset; and
6. Optional headset speaker (not shown here) coupled though the headset modular jack 40 and lines 42 to enable audio output while using is wearing a headset.

It should be noted that the phone ringing audio output function may be performed by the said phone base speaker 35 or by a dedicated sound transducer (not shown here). When handset 22 is in its cradle (not seen in these figures) it mechanically activates through lever 21, the off-on hook switch 18 that in turn coupled to the microcontroller function 10 via line 19. The off-on hook switch 18 senses when the handset 22 is being placed on the phone device 100 or when the user removed it to place a call. The off-on hook switch 18 may be a simple electromechanical switch, magnetic proximity sensor or optical-switch depending on device specific design.

In some VoIP phone devices the handset or the base is further equipped with LED indicator 25 for call and voice messages. This indicator LED 25 is used to indicate whether you have an incoming call (for example by flashing red color) or a new voice message (for example by steady red color). LED indicator 25 is derived by the microcontroller function 10 through line 24.

LED indicator 25 may be single color LED that illuminate steadily or blink. It may also be multi-color LED or multiple individual LEDs. For example in some devices steady green LED indicate on-going call while red LED indicate phone ringing.

With reference to FIG. 1 the following security vulnerabilities may be further described:

1. If remote attacker can tamper or modify the software running on microcontroller function 10, handset microphone 27 may be activated without any user action to enable audio eavesdropping by sending surrounding conversation audio via microcontroller function 10 over the IP network to the remote attacker;

2. If remote attacker can tamper or modify the software running on microcontroller function 10, base microphone 37 may be activated without any user action to enable audio eavesdropping by sending surrounding conversation audio via microcontroller function 10 over the IP network to the remote attacker;

3. If remote attacker can tamper or modify the software running on microcontroller function 10, handset headphone element 26 may be activated and abused as a low-gain dynamic microphone without any user action to enable audio eavesdropping by sending surrounding conversation audio via microcontroller function 10 over the IP network to the remote attacker;

4. If remote attacker can tamper or modify the software running on microcontroller function 10, base speaker 35 may be activated and abused as a low-gain dynamic microphone without any user action to enable audio eavesdropping by sending surrounding conversation audio via microcontroller function 10 over the IP network to the remote attacker;

5. If remote attacker can tamper or modify the software running on microcontroller function 10, optional headset microphone may be activated without any user action to enable audio eavesdropping by sending surrounding conversation audio via microcontroller function 10 over the IP network to the remote attacker;

6. If remote attacker can tamper or modify the software running on microcontroller function 10, optional headset speaker may be activated and abused as a low-gain dynamic microphone without any user action to enable audio eavesdropping by sending surrounding conversation audio via microcontroller function 10 over the IP network to the remote attacker;

It should be noted that since the off-on hook switch 18 is coupled to the microcontroller function 10 input port, such input may be ignored if software is being modified.

It should be noted that the "standard, non-secure VoIP phone" as referred to herein may comprise security measures others than the subject of the current invention. Such "standard security measures" may include: physical locks to prevent removing the phone or unauthorized use of it; encryption the voice data or scrambling the voice; incoming call ID or outgoing call ID masking, etc. The electronics hardware in a standard VoIP phone, that performs the VoIP functions is defined in FIG. 1 (zone 199) and will be termed herein as "phone's standard hardware"; or "phone's non-secure hardware".

Similarly, some of the user's inputs and outputs are defined in FIG. 1 (zone 198a) and are termed "non-secure user's inputs and outputs" when used in the art. Same elements, when secured by the security implants of the current invention (zone 198 in FIGS. 2 and 3C) are termed secure inputs and outputs 198.

FIG. 2 schematically illustrates security enhanced VoIP phone device 200 according to an exemplary embodiment of the current invention.

It should be noted here that although in this example embodiment of the current invention implant 20 is a separate PCBA added after production to the VoIP Phone device, similar functions may be added to the original device design on same PCBA to avoid the need to modify the device after production.

The phone functionality of the embodiment depicted in FIG. 2 is similar to that depicted in FIG. 1 and thus, only the added elements aimed at mitigating the security vulnerabilities described above by means of security implant function 20. Security implant function 20 may be implemented through a dedicated implant that assembled inside a standard (non-secure) VoIP device 100 of FIG. 1 above or embedded inside the design of a secure phone device.

Security implant function 20 is connected between the handset 22 microphone element 27 and the audio CODEC or processor function 14 through coiled multi-conductor cable 28, handset modular jack 29, lines 30b and port M5 at the handset side. It is further coupled to the audio CODEC or processor function 14 through port M6 and lines 30a on the other side.

Security implant function 20 is connected between the handset 22 headphone element 26 and the audio CODEC or processor function or processor 14 through coiled multi-conductor cable 28, handset modular jack 29, lines 32b and port S5 at the handset side. It is further coupled to the audio CODEC or processor function 14 through port S6 and lines 32a on the other side.

Security implant function 20 is connected between the base microphone element 37 and the audio CODEC or processor function 14 through lines 38b and port M1 at the microphone side. It is further coupled to the audio CODEC or processor function 14 through port M2 and lines 38a on the other side.

Security implant function 20 is connected between the base speaker 35 and the audio CODEC or processor function 14 through lines 36b and port 51 at the speaker side. It is further coupled to the audio CODEC or processor function 14 through port S2 and lines 36a on the other side.

Security implant function 20 is further connected between the optional headset microphone element and the audio CODEC or processor function 14 through the optional headset modular jack 40, lines 41b and port M3 at the jack side. It is further coupled to the audio CODEC or processor function 14 through port M4 and lines 41a on the other side.

Security implant function 20 is further connected between the optional headset headphone element and the audio CODEC or processor function 14 through the optional headset modular jack 40, lines 42b and port S3 at the jack side. It is further coupled to the audio CODEC or processor function 14 through port S4 and lines 42a on the other side.

Security implant function 20 is further connected between the off-on hook switch 18 and the microcontroller function 10 through lines 19b and port D1 at the switch side. It is further coupled to the microcontroller function 10 through port D2 and lines 19a on the other side.

Security implant function 20 may also be connected to the microcontroller function 10 one or more flash memory bus lines through lines 48 to enable write-protection or trusted boot of the microcontroller function 10.

Security implant function 20 is further coupled to a tempering switch 45 that is strategically located inside the VoIP phone device 200 enclosure 299 to enable detection of mechanical tampering attempt. Battery 46 powers the security implant function anti-tampering when device is unpowered.

Tampering Evident Label 47 is strategically located on the VoIP phone device 200 enclosure partying-line to provide visible indications in case that attacker may attempt to gain physical access to the device internal circuitry. Such label may be special holographic type to allow positive identification of the trusted supply source.

Low-voltage DC power to the security implant function 20 is supplied via lines 5a from the PoE block 4. It should be noted that typical prior art VoIP Phone is having excess power capabilities and therefore the small amount of power needed for the security implant 20 may be typically extracted from that device PoE block 3 or from the low voltage DC/DC converters that are coupled to it. For example security implant 20 may be coupled to the device 3.3V power plane and consume 20 to 30 mA of power in normal use.

As can be seen by noting the differences between FIG. 1 and FIG. 2, a security implant (marked as 20, 20a, 20b within the dashed line box) was added to a standard VoIP phone of FIG. 1. The security implant separates the phone's standard hardware 199 (to the right of the implant, within the dashed line box) from the secure inputs and outputs 198 (earphones/speakers, microphones, off-on hook switch, and the LED indicator, to the left of the security implant, within the dashed line box).

The operation of the phone's standard hardware is unchanged, providing the full usability and operation options of the standard VoIP phone of FIG. 1. However, the access of the phone's standard hardware 199 to the secure inputs and outputs is under the strict control of the security implant. Thus, the user can be assured that once a call is not in progress (hand set 22 is on-hook, LED indicator 25 not showing "call in progress" indication), no eavesdropping may be activated as all the microphones and earphones/speakers are disconnected by the trusted security implant.

The abovementioned separation of the VoIP phone into three zones:
Phone's standard hardware 199;
Security implant; and
Secure inputs and outputs 198, may be used by phone manufactures to provide secure and non-secure versions of their VoIP products with minimal design or re-design efforts. For example, all the parts outside the security implant may be designed and/or purchased from a low-security outside vendor, or based on a previous non-secure product.

Similarly, security qualification tests and verifications needs to be applied only to the security implant in order to qualify the entire secure VoIP phone.

FIG. 3A schematically illustrates the security implant function 20 shown in FIG. 2 above according to an exemplary embodiment of the current invention. This figure specifically illustrating Cisco 7811 VoIP phone (Cisco Systems, Inc. Corporate Headquarters 170 West Tasman Dr. San Jose, Calif. 95134; USA. information available from: www-.cisco.com/c/en/us/products/collaboration-endpoints/ip-phone-7811/index.html.). Still with minor changes similar implants may be designed to fit most standard VoIP phone models. Such implementations are within the scope of the current invention.

It should be noted here that the term implant that used here may include implementations such as an extra Printed Circuit Board Assembly or module attached to standard VoIP phone or module that being implemented by the phone vendor in its finished product as an optional plug-in module or as standard function for that model. Such implant may be a single piece, or few items (such as multiple PCBAs), and may include mechanical connections to the frame, housing or internal parts of the standard VoIP phone. Cabling, battery, battery holder, and connectors may also be a part of the implant.

Implant port D1 is coupled externally to the off-on hook switch 18 through line 19b. Implant port D1 is coupled internally to the security microcontroller function 72 input port I1. It should be noted that security functions may be implemented with other electronic functions such as: Complex Programmable Logic Device (CPLD), Application Specific Integrated Circuit (ASIC), Field-Programmable Gate Array (FPGA), or discrete components. It is also possible to connect the input port I1 directly to ports O1, O2 and O3 and therefore completely eliminate this function. Security microcontroller 72 receives the state of the off-on hook switch 18 and generate appropriate off-on hook command to the VoIP phone microcontroller function 10 through output port O3, implant port D2 and line 19a. This exemplary of the current invention allows the security microcontroller function 72 to monitor the state of the phone handset and to manipulate that signal to the phone microcontroller function.

In the security module 20 shown in this figure, there are essentially two separate audio switching command outputs of security microcontroller function 72:

1. O1 through lines 63 mutes all 3 audio input sources (handset microphone element 27, headset microphone (via line 41b) and base microphone element 37).

2. O2 through lines 65 mutes all 3 audio outputs (handset speaker 26, headset speaker (via line 42b) and base speaker 35).

Security microcontroller function 72 can mute all audio inputs when there is no active call detected. It can further mute all audio outputs when there is no active call or ringing detected.

The term mute used here means that:

1. Audio input transducer is isolated (disconnected) from its audio CODEC or process input circuitry;

2. Audio output transducer (speaker) is isolated (disconnected) from its audio CODEC or process output circuitry;

Implant port M1 is coupled externally to the base microphone 37 through line 38b. Implant port M1 is coupled internally to first analog audio switch 60. First analog audio switch 60 is preferably a solid-state SPDT (Single Pole Dual Throw) switch but may be any other switch type (for example reed relay or small signal relay). First analog switch 60 is driven by the security microcontroller function 72 output port O1. First analog audio switch 60 is normally shorting the preamplifier input in the audio CODEC or processor 14 to the ground (switch is in the lower position as shown in the figure). Only when signal 63 is asserted by the security microcontroller function 72 output port O1, Audio CODEC or processor 14 microphone input port is routed through line 38a, security implant port M2, first analog switch 60, implant port M1 and line 38b to the base microphone 37 to enable secure use of that microphone.

Similarly, implant port S1 is coupled externally to the base speaker 35 through line 36b. Implant port S1 is coupled internally to second analog audio switch 62. Second analog switch 62 may be SPDT or Dual Pole Dual Throw (DPDT) (if differential speaker signal must be supported). An example of such analog audio switch is Texas Instruments (TI) TS5A22364-Q1. This chip comprises of low-distortion 0.65-Ω Dual SPDT Analog Switch with Negative Signaling Capability.

Second analog switch 62 is driven by the security microcontroller function 72 output port O2. Second analog audio switch 62 is normally shorting the base speaker to the ground (switch is in the lower position as shown in the figure), only when signal 65 is asserted by the security microcontroller function 72 output port O2, Audio CODEC or processor 14 speaker output is routed through line 36a, security implant port S2, second analog switch 62, implant port S1 and line 36b to the base speaker 35 to enable secure use of that speaker. It should be noted that this analog audio switch 62 may be alternatively replaced by audio diode as shown in next FIG. 3C.

Similarly, implant port M5 is coupled externally to the handset microphone element 27 (shown in FIG. 2 above) through line 30b, handset modular jack 29 and coiled multi-conductor cable 28. Implant port M5 is coupled internally to third analog audio switch 68. Third analog switch 68 is driven by the security microcontroller function 72 output port O1 (same output port that drives the first analog audio switch) or by a separate output port if needed. Third analog audio switch 68 is normally shorting the preamplifier input in the audio CODEC or processor 14 to the ground (switch is in the lower position as shown in the figure). Only when signal 63 is asserted by the security microcontroller function 72 output port O1, Audio CODEC or processor 14 microphone input port is routed through line 30a, security implant port M6, third analog switch 68, implant port M5, line 30b, handset modular jack 29 and coiled multi-conductor cable 28 to the handset microphone element 27 to enable secure use of that microphone.

Similarly, implant port S5 is coupled externally to the handset headphone element 27 (shown in FIG. 2 above) through lines 32b, handset modular jack 29 and coiled multi-conductor cable 28. Implant port S5 is coupled internally to fourth analog audio switch 70. Fourth analog switch 70 may be driven by the security microcontroller function 72 output port O2 as show in FIG. 3 or by a separate output port if needed. Fourth analog audio switch 70 is normally shorting the base speaker to the ground (switch is in the lower position as shown in the figure), only when signal 65 is asserted by the security microcontroller function 72 output port O2, Audio CODEC or processor 14 audio output is routed through line 32a, security implant port S6, fourth analog switch 70, implant port S1 and line 32b, handset modular jack 29 and coiled multi-conductor cable 28 to the handset headphone element 26 to enable secure use of that handset.

It should be noted that this analog audio switch 70 may be alternatively replaced by audio diode as shown in next FIG. 3C.

Similarly, implant port M3 is coupled externally to the optional headset microphone element through line 41b, and headset modular jack 40 shown in FIGS. 1 and 2 above). Implant port M3 is coupled internally to fifth analog audio switch 64. Fifth analog switch 64 is driven by the security microcontroller function 72 output port O1 (same output port that drives the first analog audio switch) through line 63 or by a separate output port if needed. Fifth analog audio switch 64 is normally shorting the preamplifier input in the audio CODEC or processor 14 to the ground (switch is in the lower position as shown in the figure). Only when signal 63 is asserted by the security microcontroller function 72 output port O1, Audio CODEC or processor 14 microphone input port is routed through line 41a, security implant 20 port M4, fifth analog switch 64, implant port M3, line 41b, headset modular jack 40 to the headset microphone element (not shown here) to enable secure use of that headset microphone.

Similarly, implant port S3 is coupled externally to the optional headset headphone element through lines 42b, and headset modular jack 40 shown in FIGS. 1 and 2 above. Security implant 20 port S3 is coupled internally to sixth analog audio switch 66. Sixth analog switch 66 may be driven by the security microcontroller function 72 output port O2 as show in FIG. 3 or by a separate output port if needed. Sixth analog audio switch 66 is normally shorting the headset headphone element to the ground (switch is in the lower position as shown in the figure), only when signal 65 is asserted by the security microcontroller function 72 output port O2, Audio CODEC or processor 14 audio output is routed through line 42a, security implant 20 port S4, sixth analog switch 66, security implant port S3 and line 42b, headset modular jack 40 to the headset headphone element to enable secure use of that headset.

It should be noted that this analog audio switch 66 may be alternatively replaced by audio diode as shown in next FIG. 3C.

In some exemplary VoIP phone devices of the current invention, the handset or the base is further equipped with LED indicator 25 for call, voice messages and for security indications. This indicator LED 25 is used to provide the following user indications:

It is used to indicate whether there is an incoming call (for example by flashing red color);

It is used to indicate if there is a new voice message (for example by steady red color);

It is used to indicate if the device is in secure state (for example by slow blinking of green color).

LED indicator 25 is derived by the security microcontroller function 72 output port O4 through security implant port D4 and line 24b. It should be noted that LED 25 indicator may be single color LED or may be replaced by a bi-color LED to support more user indications. Security microcontroller function 72 is further coupled to the VoIP phone device 100 microcontroller function 10 through input port 12, security implant port D3 and line 24a.

Security microcontroller function 72 may pass indication commands from microcontroller function 10 or may generate local or modified user indications as needed.

Security implant 20 may be further equipped with active-anti-tampering subsystem to enable self-destruction in case that the VoIP phone device 200 is being tampered. Tampering switch 45 is located in such location that any attempt to gain access to the security implant 20 or to the VoIP phone circuitry will release the switch 45. Upon releasing tampering switch 45, the security implant 20 security microcontroller 72 coupled to the switch through input port I2, is causing irreversible change or damage. Such change or damage may cause the following device behavior:

1. All audio switches are disabled (preventing any audio input or output devices from connected to the audio CODEC or processor 14; and 2. Audio tone is injected into the base speaker to alert the user; and 3. Indicator LED 25 is operating in tampering mode (for example alternate flashing of green and red).

Security implant 20 is powered from the VoIP phone device 200 POE block 4 of FIG. 2 above via line 5a. Additional DC/DC converters may be added in the security implant to convert the available voltage to required voltage if necessary.

Security implant 20 may be further equipped with audio alert function that uses the security microcontroller 72 Pulse Width Modulation (PWM) or General Purpose Input Output (GPIO) port P1 to generate audio sound wave. Other means for signal generation, or a dedicated buzzer may be used, this wave is routed through an optional audio amplifier 77 and line 78 to the second audio switch lower port. It should be noted that in the case that this option is used, the ground should be disconnected. Amplified audio signal is then routed through security implant 20 port S1, and line 36b to base speaker 35.

To enable anti-tampering sub-system to operate when the VoIP phone device 200 is in storage or in the supply chain (device unpowered), the security implant 20 may be further equipped with battery cell or super-capacitor 46.

Security implant 20 security microcontroller 72 may sample incoming audio signal from implant port S2 through line 67 and security microcontroller 72 Analog to Digital port A/D to enable detection of activity such as ringing. Such detection may assist with or without LED indicator 25 output in determining when the base speaker 35 should be active and when it should be isolated for security.

Security implant 20 may further be coupled through lines 48 and flash protection electronic circuitry 75 to the VoIP phone device 200 flash interface to enable certain flash security functions. Such flash protection functions may include:

1. Protection of the flash device from firmware upgrades;
2. Protection of the flash device from certain write/erase operation;
3. Emulation of the flash device and boot from flash located in the flash protection electronic circuitry 75;
4. Detection of unauthorized flash operations and reporting to the security microcontroller function through lines 76 and port IO;
5. Permission to perform certain flash operations from security microcontroller 72 through IO port, lines 76 and the flash protection electronic circuitry 75;

FIG. 3B schematically illustrates another exemplary security implant function 20a similar to the security implant 20 of FIG. 3A above according to an exemplary embodiment of the current invention.

In this configurable security implant 20a, external USB or serial communication with the security microcontroller 72 port U is possible through one of the external interfaces—the handset modular jack 29 in this example. Such USB or serial communication may be accomplished through the connection of special RJ11 modular plug to USB Type-A plug cable, that can be plugged into the VoIP phone device 200 handset modular jack 29 using special RJ11 to USB Type-A cable. It should be noted that analog audio switch 68 and all other audio switch functions, may be Single Pole Dual Throw (SPDT) that switches a single line or preferably Dual Pole Dual Throw (DPDT) that switches two lines. Therefore such audio switch 68 may support USB DM (Data Minus) and DP (Data Plus) lines.

An example of analog audio switch 68 capable of switching both audio and USB is Texas Instruments (TI) TS5USBA224 chip. This chip integrates DPDT multiplexers that enables USB 2.0 High-Speed (480 Mbps) and Audio with Negative Signal switching.

Once connected to a PC or laptop running special software application, the security implant 20 is enumerated as USB device (for example: CDC or Custom USB device). Then once the system administrator was properly identified and authenticated, the software application may be used to perform configuration or to upgrade the security implant firmware.

Security microcontroller 72 may further have an internal non-volatile memory such as flash to support Log function to store important security events. Such event may be for example: changes in policy, tampering triggering events etc. Log events may be stored on security microcontroller internal non-volatile memory or external flash memory device coupled to the security microcontroller 72.

Security implant 20 (or 20a) may block flash 11 write transactions unless authorized by connected PC configuration. This function may hold flash device 11 in write-protect state through lines 48.

FIG. 3C schematically illustrates yet another security enhanced VoIP phone device having an exemplary security implant function 20c similar to the security implant 20 of FIG. 3A above according to an exemplary embodiment of the current invention having LAN management interface instead of PC interface.

Security implant 20c is further coupled to the device LAN switch 3 to support management through the LAN.

The security implant 20c security microcontroller 72c is coupled through interface 88. Interface 88 may be standard protocol such as: LAN, RGMII, MII, or MDI. Interface 88 is connected to the LAN switch 3 port P2 by cutting the traces in 89 that connected to the PC jack 2. It should be noted here that in secure use PC LAN jack 2 would not be used anyway as VoIP and PCs are usually not mixed together.

Nevertheless such solution utilizing network connection for security management may weaken the device security as it may expose it to hacking from the LAN as opposed to USB interface that requires physical access to the target device.

FIG. 3D schematically illustrates another exemplary security implant function 20b similar to the security implants 20 and 20a of FIGS. 3A, 3B and 3C above according to an exemplary embodiment of the current invention.

In this configurable security implant 20b, the 3 analog audio switches 62, 66 and 70 were replaced by audio diodes 71a, 71b and 71c respectively. Audio diodes 71x are electronic circuitry (typically amplifier) that pass audio signals in one direction but blocks it in the opposite direction. The use of such audio diodes 71x prevents the potential abuse of the base speaker, handset headphone element and headset headphones element as low-gain dynamic microphone. This implementation of the current invention allows these audio output transducers to be continuously coupled to the device output circuitry without any switching.

FIG. 4A schematically illustrates a rear-view of a typical VoIP phone device 100 known in the art (similar to the device shown in FIG. 1 above) with cover removed to expose the internal physical layout.

In this prior-art device (Cisco 7811 VoIP phone), the rear plastic cover was removed to better illustrate and identify the device internal parts.

Plastic enclosure 81 is the front part of the enclosure typically embedding the display 12 and the keypad 8 (not shown here). Main electronic board 80 is a PCBA (Printed Circuit Board Assembly) having different electronic components such as the microcontroller function 10 and the flash device 11 soldered to it. Also soldered to the main electronic board 80 are the DC jack1, LAN jack 1, PC LAN jack 2 and handset modular jack 29. Handset modular jack 29 is coupled to the audio CODEC/processor 14 through lines (PCB traces) 30 for the microphone and lines (PCB traces) 32 for the headphone element.

Main electronic board 80 is mechanically coupled to the plastic enclosure 81 through multiple plastic screws 23.

Base microphone 37 is typically installed inside a rubber housing to provide noise and vibration isolation. Base microphone 37 may be soldered to the main electronic board 80 directly or wired to it through wires 38 and soldered to soldering pads 38s as shown in this FIG. 4.

Base speaker 35 is typically coupled to the plastic enclosure 81 under the handset base inside an acoustically insulated rubber bay 82. This bay may be sealed by rubber seal to prevent acoustic feedback to the base microphone 37. Base speaker 35 is wired to the main electronic board 80 through wires 36 and soldering pads 36s.

LED indicator 25 and off-on hook switch 18 are both soldered to a smaller handset PCBA 83 that is coupled to the main electronic board 80 through wires 19 and 24 and soldering pads 19s and 24s respectively. Wires used in specific VoIP phone device 100 may be of different types, for example: single conductor, multiple conductors, and ribbon cable, flat cable etc.

FIG. 4B schematically illustrates a rear-view of a VoIP phone device 200 according to an exemplary embodiment of the current invention (similar to the device shown in FIGS. 2 and 3A-B above) with cover removed to expose the internal physical layout.

In this VoIP phone device 200 security implant 20 was wired to the different components during after-market upgrade process.

Security implant 20 is mechanically coupled to the plastic enclosure 81 through two of the original plastic screws 23 that were removed and reassembled in two matching holes in the security implant 20. Coin battery 46 is soldered to the security implant 20 or inserted inside a soldered battery socket. Anti-tampering switch 45 is soldered to the security implant 20 in a location that assures that the switch lever is pushed by the rear cover. Switch location releases the switch lever if rear cover is removed or gaped.

Security implant 20 is powered from the main electronic board 80 PoE block 4 (not shown here) through soldering pads 5s, wires 5a and implant soldering pads P.

Base microphone 37 wires 38b are soldered to the security implant 20 soldering pads M1. Security implant 20 soldering pads M2 are wired through short wires 38a to the main electronic board 80 soldering pads 37s to route the switched base microphone 37 audio signals.

Similarly, base speaker 35 wires 36b are soldered to the security implant 20 soldering pads S1. Security implant 20 soldering pads S2 are wired through short wires 36a to the main electronic board 80 soldering pads 36s to route the switched base speaker 35 audio signals.

LED indicator 25 and off-on hook switch 18 are wired to the security implant 20 soldering pads D1 and D4 through wires 24b and 19b respectively. Security implant 20 soldering pads D2 and D3 are wired to the main electronic board 80 soldering pads 24s and 19s to interface with the off-hook switch and indicator LED drive circuitry.

Microcontroller function 10 to flash device 11 interface is wired through wires 48 to security implant 20 soldering pads F to protect the flash device from unauthorized operations.

Handset modular jack 29 traces 30 and 32 were cut and wired to the security implant 20 through additional wires as shown in FIG. 4C below.

FIG. 4C schematically illustrates in greater details the security implant 20 wiring to the handset modular jack 29 according to an exemplary embodiment of the current invention.

PCB trace 32 that drives the handset headphone element 26 was cut to connect the security implant 20 in the middle to enable switching. Alternatively, series electronic component located on that trace 32 such as capacitor or resistor may be removed to avoid cutting the trace. The part of the trace that is connected to the handset modular jack 29 is wired by wire 32b to the security implant 20 soldering pad S5. The main electronic board 80 circuitry that drives the handset headphone element 26 is connected through wire 32a that is soldered to the security implant 20 soldering pad S6.

Similarly, PCB trace 30 that coupled to the handset microphone element 27 was cut to connect the security implant 20 in the middle to enable switching. Alternatively, series electronic component located on that trace 30 such as capacitor or resistor may be removed to avoid cutting the trace. The part of the trace that is connected to the handset modular jack 29 is wired by wire 30b to the security implant 20 soldering pad M5. The main electronic board 80 circuitry that amplifies the handset microphone element 27 is connected through wire 30a that is soldered to the security implant 20 soldering pad M6.

The interface between the headset modular jack and the security implant 20 is similar to the handset interface described above.

FIG. 5A schematically illustrates a high-level block diagram 300 of method for powering up a device 100 according to an exemplary embodiment of the current invention.

In step 301 the VoIP phone device is powered up through connection of LAN having PoE or through external DC power source. During phone boot-up and power up, the security implant security microcontroller 72x (herein "72x" may stand for "72", "72a", "72b", or "72c") is booting and powering up as well and perform self-test. Self-test covers the critical operational and security function of the implant to assure proper operation. If self-test failed—the security implant mute (disable) audio outputs (through line 65) and inputs (through line 63) and provide proper user warning indications through LED 25.

If self-test passed, then in step 302 the security implant security microcontroller 72x is muting both audio inputs and audio outputs through lines 63 and 65 respectively. In same step 302, security microcontroller 72x also drives the green LED 25 to indicate secure state by slowly blinking in green color (Security LED—SL).

In next step 304, security microcontroller 72x checks if it was tampered (anti-tampering switch 45 opened while operating on battery 46). If tampered (Yes) then security microcontroller 72x enter tampered state 305. In that state, the phone is permanently and irreversibly disabled and secured (all audio is muted), and LED 25 provides proper tampering indications—for example solid red LED illumination. In addition audio tone may be played as aural warning.

Optional steps 306, 307, and 308 are relevant for security microcontroller 72x, for example 72a, and 72b seen in FIGS. 3B and 3D respectively. They may be omitted if security microcontroller 72 is used in the configuration seen in FIG. 3A. If device was not tampered (No in step 304), then in next step 306 the security microcontroller 72x switch the handset analog switch 68 to the USB option and attempt to detect connected PC (PC in this example is connected prior to the phone and security implant power up. If connected PC detected, security microcontroller will enumerate and prompt for administrative user credentials to start programming mode in step 305. While in programming mode, the security microcontroller function 72x will enable management functions such as: get firmware updates, get configuration updates and enable log download. Optionally, all microphones are mute, and the phone cannot receive of initiate calls while in programming mode.

If PC was not detected in step 307 (or no such option available, as seen in FIG. 3A), in next step 309 security microcontroller 72x will enter Normal Operation mode and wait for detected events.

If tampering was detected at any time after that (while device is still powered), it will immediately change to tampered mode in step 305 above.

The device operation while in Normal Operating mode 309 if further described in FIG. 5B below.

FIG. 5B schematically illustrates a high-level block diagram of a method 350 of operation of a VoIP phone device 100 while it is in Normal Operating mode, according to an exemplary embodiment of the current invention, While in normal operation mode 309, device 100 performs the following:

In step 311 the security microcontroller is waiting for an event.

The following events may be detected by the security microcontroller 72x:

The user removed the handset and the hook switch 18 is off-hook;
The phone is ringing; or
The user initiated a speaker-phone call by pressing the appropriate phone button.

It should be noted that the fourth event—tempering detected is already covered in FIG. 5A and therefore it is not shown in this figure.

In the case that in step 311 security microcontroller 72x detected off-hook event, it will continue to step 320 to check if call LED is on. Detection of the off-hook event is starting with switch 18 being released by the handset removal. Then line 19b that is coupled to the security implant port D1 changes state. Implant port D1 is coupled to the security microcontroller 72x input port I1. Once it is on (call in progress LED detected by line 24a that is coupled to implant port D3 and then to security microcontroller input port I2) then in step 321 the security microcontroller will unmute both audio in and audio out through security microcontroller output ports O1 and O2 and lines 63 and 65 respectively. At the same time security microcontroller 72x will release the off hook line connected to the phone microcontroller 10 through output port O3, implant port D2 and line 19a.

Then when on-hook state detected 322 through switch 18 (call disconnected by the user) or call LED is off (call disconnected by the other side) then security microcontroller 72x move to step 323 to mute both audio in and audio out through lines 63 and 65 respectively. At the same time security microcontroller 72x changes the state of the hook switch line 19a to signal the phone microcontroller 10 that the call should be terminated.

Then security microcontroller 72x then move back to Normal Operating mode in step 309 above and wait for the next event 311.

In the case that in step 311 security microcontroller 72x detected ringing event through line 24a, then it will move to step 324 to unmute audio out only through line 65. This will allow base speaker 35 to play the ringing tone or tune. If ringing terminated without answer (end of ringing LED indication captured by line 24a) then security microcontroller 72x will mute again the audio outputs through port O2 and line 65.

In the next step 325 the security microcontroller function 72x is waiting for two events (both events should happened)—off hook state detected by switch 18, and call LED is on. By sensing line 24a and line 19b. If both events are verified then security microcontroller 72x will move to step 326 to unmute audio inputs through line 63. This will allow the conversation to start as phone device will be able to use base microphone 37, handset microphone 27 or headset microphone to capture the user audio. Selection of which microphone(s) is (are) active during an active call, and/or which speaker(s) is (are) active during an active call is done within microcontroller 10, as is done in the non-secure VoIP device 100 of the art.

Then in the next step 327, if microcontroller function 72x detects that the off-hook switch 18 is on-hook (via line 19b) or if call LED is off (via line 24a), then it will move to step 328 below to mute both audio input and output through lines 63 and 65 respectively.

Then security microcontroller 72x then move back to Normal Operating mode in step 309 above and wait for the next event.

In the case that in step 311 security microcontroller 72x detected that speaker phone conversation started by sensing call LED line 24a activity while hook switch 18 is on-hook (via line 19b), it will then move to step 330 below.

In the next step 330 the security microcontroller function 72x is waiting for two events (both events should happened)—off hook state detected by switch 18, and call LED is "On" (by sensing line 24a, and line 19b). If both events are verified then security microcontroller 72x will move to step 331 to unmute audio inputs through line 63. This will allow the conversation to start as phone device will be able to use base microphone 37, handset microphone 27 or headset microphone to capture the user audio.

It should be noted that while using a secure VoIP example embodiment of the current invention, the operator must remove the handset from the phone whenever a call is active (including when speaker phone call is active). This will remind the user that there is an active call and maintain the audio inputs and outputs in active state.

Then in the next step 332, if microcontroller function 72x detects that the off-hook switch 18 is on-hook or if call LED is off, if so, then it will move to step 333 below to mute both audio input and output through lines 63 and 65 respectively and the call will be terminated.

Then security microcontroller 72x then move back to Normal Operating mode in step 309 above and wait for the next event.

It should be noted here that the security implant may manipulate the user indications based on its pre-programmed logic to assure that the indications provided are both usable and secure.

It should be noted that this flow may be further modified to support specific phone behaviors and indications.

In some embodiments the security microcontroller function 72x is programmed to detect abnormal on-of-hook switch activation patterns by measuring switch events timing. Pre-programmed criteria for suspicious abnormal on-of-hook switch activation may be detected. Such detection may trigger a warning signal, for example a warning sound at the base speaker, and/or flashing indicator lights. Optionally, if such pattern is detected, persists or repeated, a tamper event is initiated.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A Secure Voice over IP (VoIP) Phone device comprising:
    VoIP phone's non-secure hardware comprising:
        a Local Area Network (LAN) interface;
        at least one processor;
    secure inputs and outputs comprising:
        at least one microphone;
        at least one indicator; and
        an off-on hook switch; and
    a security implant comprising:
        at least one audio switch; and
        at least one tampering switch,
    wherein said security implant is not programmable via said VoIP phone's non-secure hardware, and
    said security implant is programmed to allow normal VoIP call by:
        connecting said at least one microphone to said VoIP phone's non-secure hardware via said at least one audio switch, and
        activating said at least one indicator to indicate active audio channel,
        only during active VoIP phone call, and only if said at least one tampering switch has not been activated;
    wherein said security implant is programmed to detect pre-programmed on-of-hook switch activation patterns by measuring timing of on-off-hook switch activation and deactivation events.

2. The Secure VoIP Phone device of claim 1 wherein:
    said secure inputs and outputs comprises a handset having a handset microphone;
    said an off-on hook switch is configured to be in "on-hook" state when said handset rests in its cradle; and
    said security implant comprises a third analog audio switch for connecting said handset microphone to said VoIP phone's non-secure hardware only during active VoIP phone call.

3. The Secure VoIP Phone device of claim 1 wherein:
    said secure inputs and outputs comprises a base microphone; and
    said security implant comprises a first audio switch for connecting said base microphone to said VoIP phone's non-secure hardware only during active VoIP phone call.

4. The Secure VoIP Phone device of claim 1 wherein:
    said secure inputs and outputs comprises a base speaker; and
    said security implant further comprises a second analog audio switch to disable said base speaker when not in use.

5. The Secure VoIP Phone device of claim 1 wherein security functions of said security implant are monitored and controlled by a dedicated security microcontroller.

6. The Secure VoIP Phone device of claim 5 wherein said dedicated security microcontroller is selectable from the list of: microcontroller, ASIC, FPGA, and PLD.

7. A Secure Voice over IP (VoIP) Phone device comprising:
    VoIP phone's non-secure hardware comprising:
        a Local Area Network (LAN) interface;
        at least one processor;
    secure inputs and outputs comprising:
        at least one microphone;
        at least one speaker;
        at least one indicator; and
        an off-on hook switch; and
    a security implant comprising:
        at least one audio switch for connecting said at least one microphone to said VoIP phone's non-secure hardware;
        at least one audio switch to disable said at least one speaker when not in use; and
        at least one tampering switch;
    wherein said security implant is not programmable via said VoIP phone's non-secure hardware, and
    said security implant is programmed to allow normal VoIP call by:
        connecting said at least one microphone to said VoIP phone's non-secure hardware only during active VoIP phone call and only if said at least one tampering switch has not been activated, via said at least one audio switch for connecting said at least one microphone to said VoIP phone's non-secure hardware, and activating said at least one indicator to indicate active audio channel only during active VoIP phone call and only if said at least one tampering switch has not been activated; and disabling said at least one speaker when not in use, via said at least one audio switch to disable said at least one speaker.

8. The Secure VoIP Phone device of claim 7 wherein said security implant is programmed to detect pre-programmed on-of-hook switch activation patterns by measuring timing of on-off-hook switch activation and deactivation events.

9. The Secure VoIP Phone device of claim 7 wherein the security implant for the VoIP Phone comprises:

a handset microphone audio mute switching function to securely disable the microphone in the handset when the handset off-hook switch is in on-hook state; and electronic circuitry coupled to said phone off-hook switch at one side and to the said mute switching function in the other side to enable trustworthy synchronization between the switch state and the audio switching functions.

10. The Secure VoIP Phone device of claim 9, further comprising an additional mute switching function to disable the phone base microphone when not knowingly selected by the user through a off-hook signal and at the same time call in progress LED is illuminated.

11. The Secure VoIP Phone device of claim 9, further comprising an additional audio mute switching function to disable the handset headphone element when knowingly selected by the user through off-hook signal.

12. The Secure VoIP Phone device of claim 9, further comprising of an additional audio mute switching function to disable the phone base speaker when not knowingly selected by the user through one of the following enabling evens that were detected by the said electronic circuit:

a. base speaker was selected by the user through speakerphone function and at the same time off-hook switch is detected to be in off-hook state; or b. phone ringing detected by said electronic circuitry by detection of signals selectable from the group consisting of: audio ringing signal; and ringing LED driving signal asserted.

13. The Secure VoIP Phone device of claim 9, further comprising an additional audio mute switching function to disable the phone headset microphone when not knowingly selected by the user through off-hook switch in off-hook state and at the same time call in progress LED driving signal is asserted.

14. The Secure VoIP Phone device of claim 9, further comprising an additional audio mute switching function to disable the phone headset headphone element when not knowingly selected by the user through off hook switch state is off-hook and at the same time call in progress LED driving signal is asserted.

15. The Secure VoIP Phone device of claim 9, further comprising an additional audio data diode between the phone audio amplifier output and the handset headphone element to prevent audio eavesdropping through said handset headphone element.

16. The Secure VoIP Phone device of claim 9, further comprising an additional audio data diode connected between the phone audio amplifier output and the base speaker to prevent audio eavesdropping through said base speaker.

17. The Secure VoIP Phone device of claim 9, further comprising an additional audio data diode connected between the phone headset audio amplifier output and the headset headphone element to prevent audio eavesdropping through said headset headphone element.

18. The Secure VoIP Phone device of claim 9, wherein security functions of the security implant are monitored and controlled by an electronic device selectable from the group consisting of: microcontroller; ASIC; FPGA; and PLD.

19. The Secure VoIP Phone device of claim 18, wherein said electronic device is having a USB interface with external connection to allow host USB device to connect to that function for data import and export.

20. The Secure VoIP Phone device of claim 18, wherein said electronic device further comprising a non-volatile memory to enable storage of security implant data selectable from the list consisting of: firmware, configuration and log.

21. The Secure VoIP Phone device of claim 20, wherein said electronic device is coupled through a switch function to an external phone interface selectable form the list consisting of: headset interface, and headphone interface via a special USB to modular plug cable.

22. The Secure VoIP Phone device of claim 18, wherein said electronic device is programmed to detect pre-programmed on-off-hook switch activation patterns by measuring switch events timing.

23. The Secure VoIP Phone device of claim 18, wherein said electronic device drives at least one LED to provide user indications when the phone is in a secure state.

24. The Secure VoIP Phone device of claim 18, wherein the security implant is coupled to the phone flash to provide write protection for said phone flash, unless flash write operation specifically allowed by the implant.

25. The Secure VoIP Phone device of claim 24, wherein phone flash write transactions of said phone flash are enabled only when user with proper credentials authenticated with a management PC connected to the security implant via a USB cable.

26. The Secure VoIP Phone device of claim 18, wherein implant is further comprising of an active anti-tampering function having at least one tampering sensor and battery for power backup to enable detection of physical tampering event and to irreversibly and permanently disable the VoIP phone device operation after being triggered.

27. The Secure VoIP Phone device of claim 18, further comprising at least one Tamper Evident Label coupled to the phone enclosure in order to provide evidence in case of attempted physical tampering.

28. The Secure VoIP Phone device of claim 18, wherein the security implant functions are added after phone production in the form of at least one PCBA, wired through means selectable from the list consisting of: existing phone cables; new cables; and connectors and cable that fit in the phone existing connectors.

29. The Secure VoIP Phone device of claim 18, wherein the security implant functions are embedded in the phone device design during production in one or more of the phone PCBAs.

30. The Secure VoIP Phone device of claim 7 wherein:

said secure inputs and outputs comprises a handset and said at least one microphone comprises a handset microphone;

said an off-on hook switch is configured to be in "on-hook" state when said handset rests in its cradle; and said audio switch for connecting said at least one microphone to said VoIP phone's non-secure hardware comprises a third analog audio switch for connecting said handset microphone to said VoIP phone's non-secure hardware only during active VoIP phone call.

31. The Secure VoIP Phone device of claim 7 wherein:
said at least one microphone comprises a base microphone; and
said audio switch for connecting said at least one microphone to said VoIP phone's non-secure hardware comprises a first audio switch for connecting said base microphone to said VoIP phone's non-secure hardware only during active VoIP phone call.

32. The Secure VoIP Phone device of claim 7 wherein:
said at least one speaker comprises a base speaker; and
said audio switch to disable said at least one speaker comprises a second analog audio switch to disable said base speaker when not in use.

33. The Secure VoIP Phone device of claim 7 wherein security functions of said security implant are monitored and controlled by a dedicated security microcontroller.

34. The Secure VoIP Phone device of claim 33 wherein said dedicated security microcontroller is selectable from the list of: microcontroller, ASIC, FPGA, and PLD.

\* \* \* \* \*